United States Patent

Elizalde et al.

[11] 4,103,407
[45] Aug. 1, 1978

[54] MANUFACTURING METHOD FOR A HIGH PRESSURE DISTRIBUTOR ROTOR

[75] Inventors: Manuel Coll Elizalde; Juan Simon Bacardit, both of Barcelona, Spain

[73] Assignee: The Bendix Corporation, Southfield, Mich.

[21] Appl. No.: 757,524

[22] Filed: Jan. 7, 1977

[51] Int. Cl.² .................. B21D 53/00; B21D 53/10; B23P 17/02

[52] U.S. Cl. ................. 29/157.1 R; 72/402; 72/416

[58] Field of Search .............. 29/157.1 R; 72/402, 72/416, 479; 251/209, 205; 91/375 A, 375 R; 137/625.3

[56] References Cited

U.S. PATENT DOCUMENTS

| 140,424 | 7/1873 | Lewis | 72/479 |
|---|---|---|---|
| 1,106,741 | 8/1914 | Slick | 72/402 |
| 1,815,626 | 7/1931 | Lee et al. | 72/402 |
| 1,921,928 | 8/1933 | Jones et al. | 29/157.3 B |
| 2,519,820 | 8/1950 | Bruegger | 29/157.3 A |
| 3,077,928 | 2/1963 | Nihlen et al. | 29/157.3 A |
| 3,800,386 | 4/1974 | Bishop | 29/157.1 R |

FOREIGN PATENT DOCUMENTS 47,184   9/1963   Poland ................ 72/402

Primary Examiner—C.W. Lanham
Assistant Examiner—Daniel C. Crane
Attorney, Agent, or Firm—Paul David Schoenle; Ken C. Decker

[57] ABSTRACT

A method for manufacturing a rotor, in particular for a power steering rotary valve, wherein a rotor is positioned in which a plurality of axial grooves have previously been designed. Tools are radially applied against the cylindrical surface portions separating two consecutive grooves of the rotor. The end surfaces of said tools has a shape adapted to match with said cylindrical surface portions when the tool comes into contact with the rotor. Each tool comprises protuding portions each forming a punch having a predetermined shape and adapted to realize chamfers in the adjacent edges of two consecutive grooves by repelling metal towards the bottom of said grooves. Radial penetration of said grooves is precisely determined, since it is limited upon contact of the tool cylindrical end surface with the corresponding cylindrical surface portion of the rotor.

4 Claims, 8 Drawing Figures

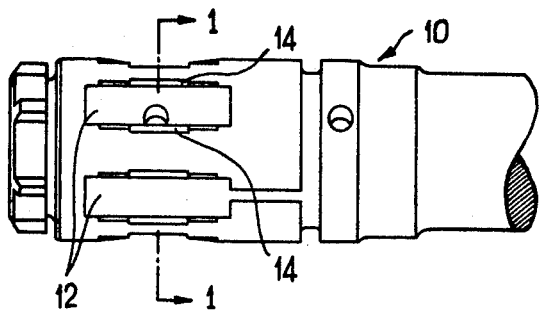
FIG.1
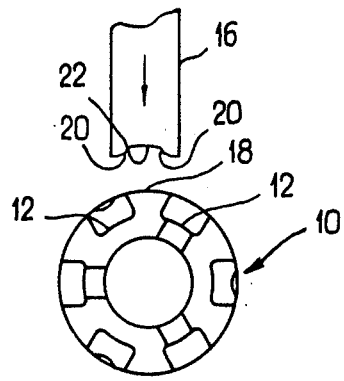
FIG.2
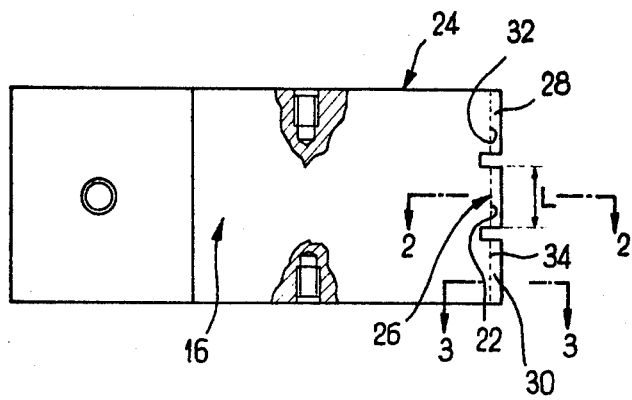
FIG.3a
FIG.3b FIG.3c

MANUFACTURING METHOD FOR A HIGH PRESSURE DISTRIBUTOR ROTOR

The present invention relates to a method for manufacturing rotors for a high pressure distributor, and is more specifically concerned with the provision of chamfers on the edges of axial grooves of said rotors.

High pressure distributors, in particular for power steering rotary valves of the open center type, usually comprise a rotor in which are defined axial grooves provided for fluid flow. This rotor is rotatably mounted inside a sleeve itself comprising a plurality of inner axial grooves cooperating with the rotor grooves. The axial grooves of the rotor and the sleeve are so disposed as to define a hydraulic restriction in the hydraulic circuit of the power steering system, and are adapted to modulate the section of a throttle disposed between the pump and the reservoir, as a function of the relative angular position between the rotor and the sleeve.

In order to vary the section of the throttle as a function of the angular position, it has already been proposed to obtain distributing chamfers in the parallel edges of the rotor grooves. These chamfers must preferably be obtained with a large precision (as great as of 3 to 5 microns).

These are generally obtained by a grinding or a milling technique. However, this type of process generally requires that the grinding wheel or milling cutter be periodically reshaped due to its rapid wear.

Moreover, the progressive wear of the grinding wheel during its utilization, does not permit obtaining rotors which all have exactly the same characteristic.

Therefore, one object of the invention is to propose an improved method for manufacturing rotors for power steering rotary valves, which avoid the above mentioned drawbacks.

According to the invention, a rotor is provided, in which a plurality of axial grooves have been previously defined, and chamfers are formed simultaneously in the adjacent edges of at least two consecutive axial grooves, said chamfers having predetermined length and depth, said chamfers being obtained upon radial application of a tool against the peripheral surface defined between the consecutive axial grooves of the rotor, said tool supporting two protuding portions, each defining a punch and having a length and a surface corresponding to the desired length and depth of the chamfers.

According to another feature of the invention, the tool has an end surface facing the peripheral surface defined between said consecutive axial grooves and having a shape which is complementary to that of the peripheral surface. The punches radially project from the surface toward peripheral surface with the distance between the punches being substantially equal to that which separates the adjacent edges.

Such feature is particularly interesting, since it permits precise control of the penetration of the punches in the edges of the consecutive grooves, so that all chamfers obtained by the method according to the invention have a similar shape.

The invention will now be described by way of example, in the ensuing description with reference to the accompanying drawings, wherein:

FIG. 1 is a general view of a rotor for power steering rotary valve;

FIG. 2 is a view in cross section taken along line 1—1 of FIG. 1 illustrating the principles of the invention;

FIG. 3a is a side view of a tool used for performing the present invention;

FIG. 3b is an upper view of the tool shown on FIG. 3a, with a partial view in cross section along the line 2—2 of FIG. 3a;

FIG. 3c is a view in cross-section taken along the line 3—3 of FIG. 3a;

Figure 4:
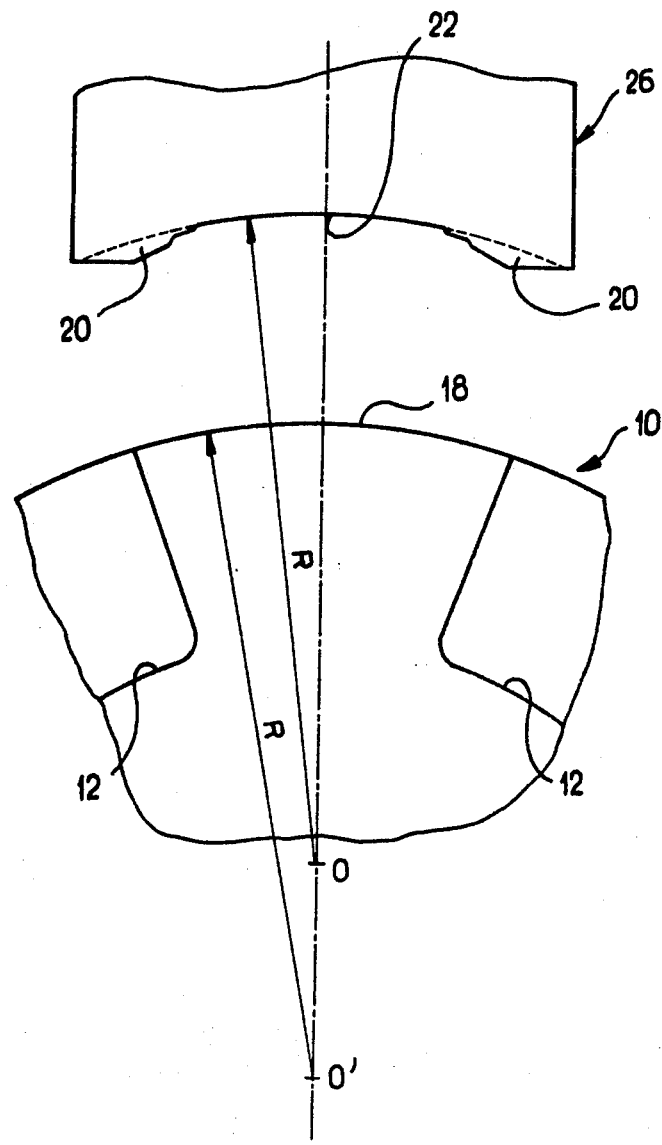
FIG. 4 is an enlarged wiew of the encircled portion of FIG. 3b.

In FIG. 1, a power steering rotary valve rotor 10 is shown. Such type of rotor is well known to those skilled in the art, and it comprises an even number of axial grooves 12 in the edges of which have been formed chamfers 14 adapted to control modulation of the power assistance pressure as a function of the angular position of the rotor.

FIG. 2 schematically shows the principles of the invention. There is represented a cross sectional view of the rotor 10, along line 1—1 of FIG. 1. The axial grooves are obtained by milling, for example.

The external surface of the rotor is thereafter rectified or smoothed, and the rotor is positioned on a table. The chamfers are obtained by radial movement of a tool 16 toward the portion of the peripheral surface 18 of the rotor which is defined between two consecutive grooves. The tool 16 comprises two protuding portions 20, each defining a punch or stamp. These portions extend radially towards the rotor and are adapted to come into contact with the adjacent edges of two consecutive grooves 12 so as to repell the metal toward the bottom of said grooves 12. The central portion 22 of the end surface of the tool 16, which faces the portion 18 of the peripheral surface, has a cylindrical shape which is complementary to that of the portion 18, so that the tool and the rotor surfaces, can come into matching abutment at the end of the punching operation. The punches 20 radially project from the cylindrical end surface toward the rotor and are separated by a distance substantially equal to that between the adjacent edges of two consecutive grooves. Therefore, upon contact between the central portion 22 of the tool end surface and the peripheral surface of the rotor, further penetration of the tool is prevented so that the depth of the chamfers is set. It becomes apparent that all chamfers designed by the method which has just been described are substantially identical. The shape of the chamfers is determined by their particular length and depth, that is by the length and depth of the protruding punches. The depth of the chamfers as a function of the angular motion, is determined by the surface of the section of the throttle which is desired for each angular position of the rotor. This surface is $S = L \times d$ wherein L is the length of the chamfer and $d$ is the depth of the chamfer.

Consequently, assuming the length is fixed at a predetermined value, it is possible to control the pressure variation as a function of the depth of the chamfer. Preferably, the length of the chamfer has a relatively small value, compared with the length of the axial grooves, and the ratio between said respective lengths is determined according to the requirements of the power steering device.

It should be noted that, although only one tool has been shown on FIG. 2, the invention is preferably performed by applying simultaneously toward and against the rotor a number of tools equal to the number of the axial grooves.

It should also be noted that, according to the method of the invention, the previous milling of the axial grooves can be done in a relatively rough manner since it is not necessary for the bottom portion of said grooves to be defined with a large precision since control of the angle pressure variation is dependent on the shape of the chamfers. Moreover, the present invention presents another advantage in that no further rectification or smoothing is necessary after the punching operation, since the rotor has not been substantially warped.

FIG. 3a is a side view of one embodiment of a tool used for performing the invention. The tool 16 comprises one head portion 24, the extremity of which is parted into a central portion 26 and two adjacent lateral portions 28, 30. The length of the central portion is equal to L, previously defined, and it supports the two punches 20, see FIG. 3b, which radially extend from the cylindrical surface 22. The lateral portions 28, 30 respectively define end surfaces 32, 34 having a cylindrical shape with a curvature radius R equal to that of the cylindrical surface 22.

Therefore, when the cylindrical surface 22 comes into abutment with the complementary surface of the rotor at the end of the punching operation, cylindrical surfaces 32 and 34 also come into abutment with the rotor so that the contact surface is increased and the pressure force of the tool is better distributed over the rotor.

FIG. 3b is a top view of the tool shown on FIG. 3a, including a partial view in cross section taken along line 2—2 of FIG. 3a. In the encircled portion A, there is shown surface 22 and punches 20 projecting from the surface. Portion A is shown in greater detail in FIG. 4.

FIG. 3c is a view in section taken along line 3—3 of FIG. 3a, and shows the cylindrical surface 34 having a raduis equal to the raduis R of the rotor.

FIG. 4 shows a cross sectional view of central portion of the tool disposed facing the rotor 10.

It is obvious that the profile of the protuding portions extending beyond the circle representing the end cylindrical surface, is only shown by way of example and is determined by the desired pressure variation. This profile can be designed by any suitable means, and in particular by a computer machine or the like.

Figure 5:
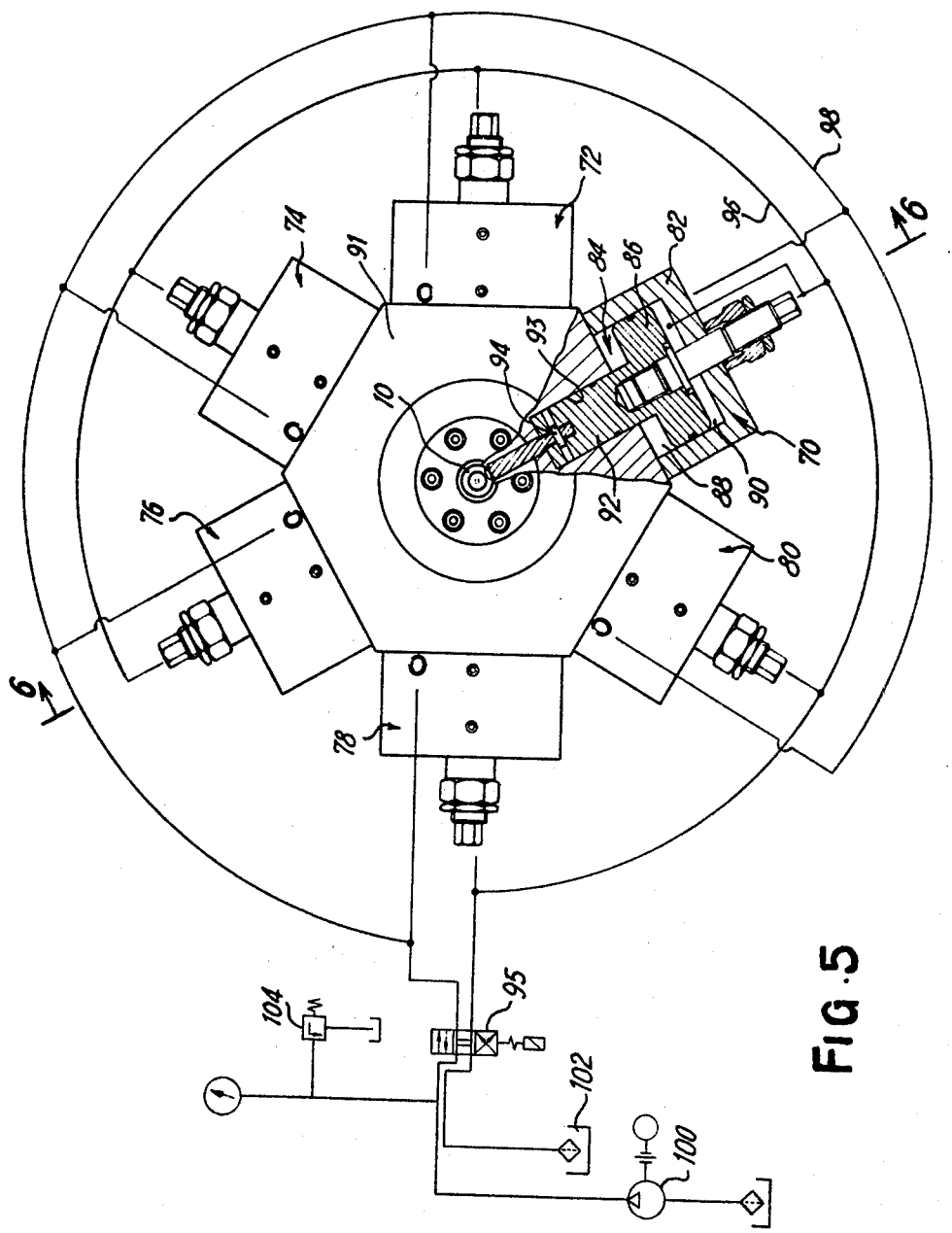
FIG. 5 is a general view representing one embodiment of an apparatus for performing the method of the invention.

FIG. 5 is a general view of an apparatus for carrying out the method according to the invention. The apparatus comprises a pedestal to receive a rotor 10 for a rotary valve for a power steering system, in which six axial grooves have previously been roughed out. The apparatus has a central support 91, in which the rotor is held, and six work stations 70, 72, 74, 76, 78, 80 regularly distributed round the periphery of the central support. Each work station is to control the movements of one tool. The six tools are arranged radially relative to the rotor, with two consecutive tools forming an angle of 60°. Means are provided for axial and angular positioning of the rotor relative to the tool. Since all the work stations are identical, only the work station 70 will be described. This comprises a housing 82 adjoining the central support 91. The housing contains a bore 84 separated by a piston 86 into two compartments 88, 90.

The piston 86 can move radially relative to the rotor 10 and has a portion 92 of reduced diameter projecting towards the rotor and slidable in a bore 93 in the central support. The piston portion 92 contains a slot capable of receiving the spigot of the tool 16. The punch piston assembly is held together by a cotter pin 94. The piston 86 can move as a result of the pressure difference between the compartments 88 and 90, which are connected to the outlet orifices of a distributor spool 95 by lines 96, 98 respectively. The distributor spool 95 is connected in turn to a hydraulic pump 100 and to a reservoir 102. A pressure relief valve 104 is connected between the outlet from the pump 100 and an auxiliary reservoir.

The operation of the apparatus just described will now be explained. Although the description relates only to the operation of the work station 70, it should be noted that the other five work stations operate simultaneously and in the same manner.

First the rotor 12 is positioned on the pedestal of the apparatus. A tool of the type shown in FIGS. 3a, 3b and 3c is then fixed to the piston 86. An operator acts on the spool of the distributor to connect the compartment 90 to the outlet of the pump 100 and the compartment 88 to the reservoir 102. The tool is applied toward the facing outer surface of the rotor which is defined between two consecutive grooves to form the chamfers as explained above (FIG. 2). The operator then moves the distributor spool 94 into a position such that the pressures in the compartments 88, 90 are reversed. The tool is retracted.

Figure 6:
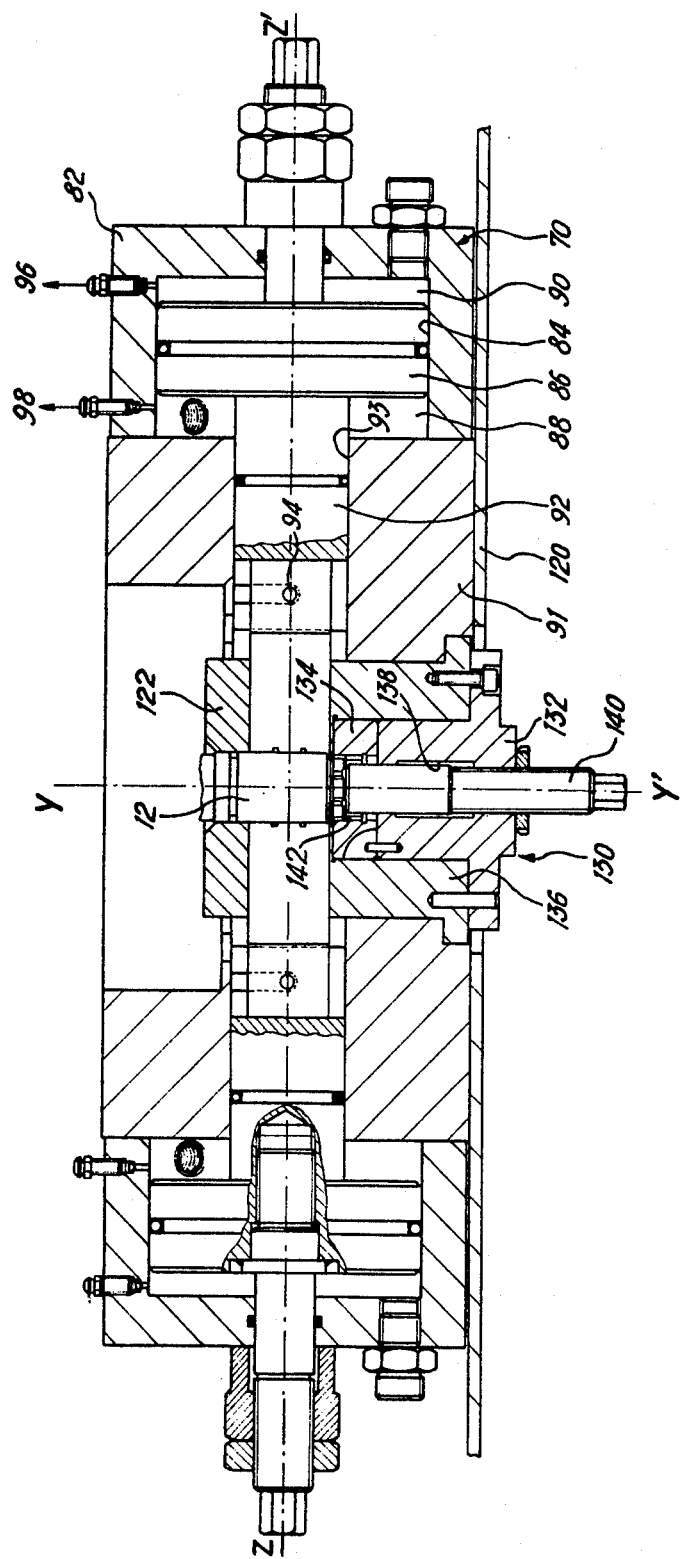
FIG. 6 is a cross sectional view taken along line 6—6 of FIG. 5.

FIG. 6 is a section view taken along a line 6—6 in FIG. 5. Elements like those in FIG. 5 bear the same reference numerals. In view of the symmetry of the Figure, only the work station 70 is illustrated in detail. The apparatus has a pedestal 120 supporting the hexagonal central support 91, which has an axis Y—Y', and the various work stations. The latter are regularly spaced about the axis Y—Y', which is perpendicular to the axis Z—Z' of the piston 86 and of the punch supported by the piston. The central support contains a stepped central orifice having the axis Y—Y' and containing registering means generally designated 130. The registering means 130 is intended to position the rotor perfectly at the beginning of operation of the rotor. The registering means comprises a base member 132, 134, 136 with a stepped central bore 138 into which a cylindrical abutment 140 having the axis Y—Y' is screwed in an adjustable manner. The rotor 10 comes to bear on this abutment when it is placed in position, so that this member positions the rotor perfectly in the axial direction. Also, axial projections 142 pointing towards the axis Y—Y' are provided in the bore 138 to cooperate with grooving in the end of the rotor 10, so as to suitably position the rotor.

It should also be noted that the invention also covers any production method of which the performance is equivalent to that of the method just described. In particular, it also applies to a method using punching in which axial recesses have previously been obtained by a punching operation in order to obtain perfectly calibrated grooves, the chamfers being further provided according to the process of the present invention.

We claim:

1. A method for manufacturing a rotor for a high pressure distributor comprising the steps of:
   providing a rotor having a plurality of axial grooves; and applying a plurality of tools radially against the peripheral surface of said rotor to form chamfers on adjacent edges of consecutive grooves, one of said tools including protruding portions defining punches of predetermined length and depth and said punches on the one of said tools contacting adjacent edges of consecutive axial grooves to form the chamfers when the one of said tools is applied radially against the peripheral surface of said rotor between the consecutive axial grooves.

2. The method of claim 1 in which each of said tools is radially actuated against said rotor to form the chamfers by repelling material along the adjacent edges of consecutive grooves towards the bottom of the consecutive grooves.

3. A method according to claim 1, wherein each tool end surface facing the peripheral surface defined between said consecutive axial grooves has a shape which is complementary to that of said peripheral surface, said punches radially projecting from said end surface toward said peripheral surface, the distance between said punches being substantially equal to that which separates said adjacent edges.

4. A method according to claim 2 wherein each tool is radially actuated toward the rotor until its end surface comes into contact with the peripheral surface of the rotor between consecutive axial grooves, thereby controlling the penetration of the punches to a predetermined depth.

* * * * *